United States Patent Office 3,781,300
Patented Dec. 25, 1973

3,781,300
METHOD OF PRODUCING 2-HALO-
3-SUBSTITUTED INDOLES
Milton Wolf, West Chester, John H. Sellstedt, St. Davids, and Harry Rosen, Drexel Hill, Pa., assignors to American Home Products Corporation, New York, N.Y.
No Drawing. Original application June 9, 1969, Ser. No. 831,702, now Patent No. 3,594,391. Divided and this application Jan. 15, 1971, Ser. No. 106,875
Int. Cl. C07d 27/56
U.S. Cl. 260—326.15                    1 Claim

ABSTRACT OF THE DISCLOSURE

There are disclosed 2-halo-3-substituted indoles which are useful as bronchodilators. Also disclosed is a process for preparing some of said compounds by halogenation of appropriate 3-substituted indoles.

---

This application is a division of U.S. application Ser. No. 831,702, which was filed June 9, 1969, and issued July 20, 1971 as U.S. Pat. No. 3,594,391.

The present invention relates to new and novel haloindoles. In particular, it concerns 2-halo-3-substituted indoles which in standard and accepted biological procedures have demonstrated activity as bronchodilators. Further, it is concerned with a new and novel process for the preparation of 2-halo-3-substituted-1-unsubstituted indoles by the halogenation of the corresponding 3-substituted indoles.

The new and novel compounds of the present invention are exemplified by the following formula:

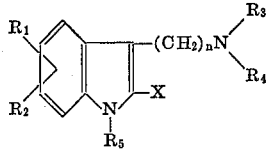

wherein $R_1$ and $R_2$ are selected from the group consisting of hydrogen, halogen, lower alkyl and lower alkoxy; $R_3$ and $R_4$ are selected from the group consisting of hydrogen and lower alkyl; $R_5$ is selected from the group consisting of hydrogen, lower alkyl, lower alkenyl, phen(lower)alkyl, halophen(lower)alkyl, tri(lower)alkoxybenzoyl, phenylsulfonyl and lower alkylphenylsulfonyl; X is selected from the group consisting of chloro, bromo and iodo; $n$ is an integer of from one to about five; and the pharmacologically acceptable acid addition salts thereof. As employed herein the terms "lower alkyl," "lower alkenyl," "lower alkoxy" and the like are meant to include both branched and straight chain hydrocarbon groups containing from one to about seven carbon atoms. Typical examples of the compounds of this invention are:

1-allyl-2-bromo-3-(2-diethylaminoethyl)indole;
1-allyl-2-bromo-3-(2-diethylaminoethyl)indole, fumarate;
2-bromo-3-(2-diethylaminoethyl)-1-(3,4,5-trimethoxybenzoyl)indole;
2-bromo-3-(2-diethylaminoethyl)-1-(3,4,5-trimethoxybenzoyl)indole, fumarate;
2-bromo-1-(p-chlorobenzyl)-3-(2-diethylaminoethyl)indole; and
2-bromo-1-(p-chlorobenzyl)-3-(2-diethylaminoethyl)indole, fumarate.

The new and novel process of the present invention is employed to prepare the 2-halo-3-substituted-1-unsubstituted indoles (II) hereof, as exemplified by the following reaction scheme:

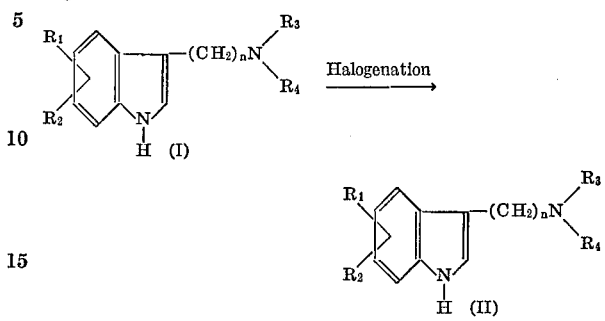

wherein $R_1$, $R_2$, $R_3$, $R_4$, X and the integer $n$ are defined as above. The halogenation reaction is effected by contacting a 3-substituted indole (I) with a halogen selected from the group consisting of chlorine, bromine and iodine, in the presence of a corresponding hydrogen halide, in an anhydrous, reaction-inert solvent at temperatures below 0° C. Preferably this reaction is conducted in anhydrous methylene chloride at a temperature of about −60° C.

When the halogenation reaction is complete, the resulting product (II) is separated by conventional recovery procedures. For example, the reaction mixture is filtered, the collected solid contacted with a base, e.g. N-methylmorpholine, sodium bicarbonate, and potassium carbonate and the like, and then crystallized from a suitable solvent, such as, acetonitrile, ethyl acetate, hexane, dioxane, tetrahydrofuran and the like, to afford a 2-halo-3-substituted-1-unsubstituted indole (II).

The new and novel 2-halo-1,3-disubstituted (IV) indoles of the present invention may be prepared by the hereinafter illustrated reaction sequence:

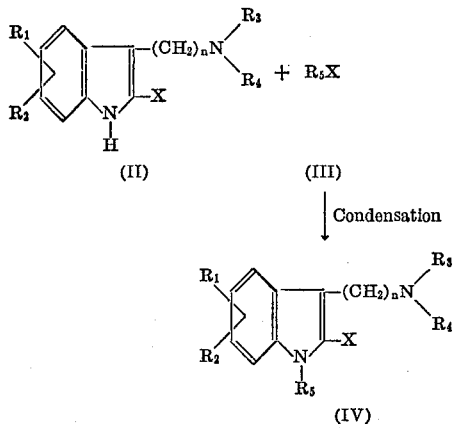

wherein $R_1$, $R_2$, $R_3$, $R_4$, $R_5$, X and the integer $n$ are defined as above. The condensation reaction may be effected by procedures well known in the chemical art. In this regard, these compounds may be prepared by contacting a 2-halo-3-substituted indole (II) with a halide (III) in an alkanol, in the presence of an alkali metal alkoxide, at about reflux temperatures until the reaction is complete. Thereafter, the resulting 2-halo-1,3-disubstituted indole (IV) is obtained by standard separation procedures, e.g.

the reaction mixture is extracted with ether which is then washed, dried and evaporated to afford the product (IV).

Since the 2-halo-3-substituted indoles (II and IV) of the present invention are basic, advantage may be taken of the water solubility of salts of these compounds formed with pharmacologically-acceptable acids having a the above compounds and in the preparation of aqueous solutions of these new compounds for oral or parenteral administration. Of course, only salts formed with pharmacologically-acceptable acids should be employed in biological applications. Particularly effective salts are those formed with pharmacologically-acceptable acids having a pK value of 3 or lower. Such acids are well known in the art, for example, hydrochloric, hydrobromic, sulfuric, nitric, phosphoric, benzenesulfonic, toluenesulfonic, methylsulfonic, ethylsulfonic, fumaric, acetic acids and the like. These salts may be prepared by procedures commonly employed in the art, for example, reacting the compound with an equivalent of the selected acid in aqueous solution and concentration of the solution. Other known procedures may also be employed.

The 3-substituted indoles (I) employed as starting materials in the new and novel process of this invention are either commercially available or are readily prepared by procedures well known in the chemical art. As employed herein the term "anhydrous reaction-inert solvent" includes those water-free solvents which will dissolve the reactants and not interfere with their interaction. Many such solvents will suggest themselves to those skilled in the art, for example, methylene chloride, chloroform, carbon tetrachloride and tetrachloroethane.

The 2-halo-3-substituted indoles (II and IV) and the acid addition salts thereof of this invention have demonstrated pharmacological activity. In particular, they have been found to act as bronchodilators when tested under standard and accepted pharmacological test procedures in animals, e.g. cats and guinea pigs. They are, therefore, deemed to possess utility in the treatment of conditions responsive to treatment with bronchodilating agents, such as the symptoms of asthma and the broncho-restrictive effects of histamine-like compounds.

In the pharmacological evaluation of the bronchodilating compounds of this invention the in vivo effects of the compounds of this invention are tested as follows:

The bronchodilator activity of a compound is determined by its ability to protect a guinea pig against the bronchoconstrictor effects of a histamine mist. A 0.2% (base) histamine diphosphate solution is atomized and sprayed into a closed chamber for 60 seconds. The guinea pig is then placed into the chamber and observed for asphyxial effects. When convulsions are imminent, the pig is removed from the chamber and allowed to recover. The time from placing the pig in the chamber until convulsions are imminent is recorded and is designated preconvulsion time. Eight pigs are used per compound and control times are obtained for each pig in the morning. Only pigs having control times in the range of fifty to one hundred seconds are used in the test. After three and a half to four hours recovery period the pigs are administered compound intraperitoneally and fifteen minutes later are again exposed to the histamine aerosol. An animal that can withstand three times its morning preconvulsion time is considered completely protected. Individual control (C) and post drug preconvulsion times (T) are recorded and an activity value calculated by the formula, (T/C), A mean (T/C) value greater than 1.2 indicates activity.

The compounds of this invention (II and IV) in the above test demonstrated a mean T/C value from about 2.0 to about 2.5 when administered intraperitoneally at a dosage of about 25 to about 50 mg./kg. of body weight.

The 2-halo-3-substituted-1-unsubstituted indoles (II) of the present invention are also useful and have utility as intermediates in the preparation of their corresponding 2-halo-1,3-disubstituted indoles (IV). Further, one of the compounds hereof, in particular, 2-bromo-3-(2-diethylaminoethyl)indole when tested in rats by the procedure of Brodie et al., Gastroenterology 15:1, 1960, demonstrated anti-ulcer activity at an oral dose of 25 mg./kg. of body weight.

When the compounds of this invention are employed as bronchodilators they may be administered to warm-blooded animls, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic. For bronchodilating purposes in addition to the above means of administration resort can be had to inhalation of aerosols or of solutions, e.g. 1:100 or 1:200.

The dosage of the present bronchodilators will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I 3-(2-diethylaminoethyl)indole (13.3 g., 0.0615 mole) is dissolved in anhydrous methylene chloride (266 ml.), and anhydrous hydrogen bromide (4.98 g., 0.0615 mole) is bubbled into the tared reaction mixture. Bromine (9.85 g., 0.0615 mole) is dissolved in methylene chloride (40 ml.) and dripped into the rapidly stirred salt solution at −60 to −65° C. over one hour. The reaction solution is stirred for ten minutes after adding the bromine, and N-methylmorpholine (6.22 g., 0.0615 mole) is added at −60° C. The mixture is allowed to warm to room temperature and stored overnight at −10° C. The precipitate is removed by filtration and added to a stirred mixture of ether and strongly basic water. Stir until the solid has dissolved, wash the ether with saturated sodium chloride until a pH 8 is achieved, dry with sodium sulfate, and evaporate under vacuum, giving a crude tan solid (15.8 g., 87%), M.P. 119–122° C. (uncorr.). The solid is crystallized from acetonitrile (90 ml.), affording white crystals of 2-bromo - 3 - (2 - diethylaminoethyl)indole (13.8 g., 76%), M.P. 124–125.5° C. (uncorr.).

Analysis.—Calcd. for $C_{14}H_{19}BrN_2$ (percent): C, 56.95; H, 6.49; N, 9.49; Br, 27.07. Found (percent): C, 56.79; H, 6.45; N, 9.39; Br, 27.38.

In a similar manner the following compounds are prepared:

2,5-dibromo-3-(3-dimethylaminopropyl)indole;
2-bromo-6-iodo-3-(3-methylaminopropyl)indole;
2-bromo-5,6-dimethoxy-3-(5-dimethylaminopentyl) indole; and
2-bromo-7-chloro-3-(2-diethylaminoethyl)indole.

EXAMPLE II 3-(2-diethylaminoethyl)indole (0.12 mole) is dissolved in anhydrous chloroform (550 ml.), and anhydrous hydrogen chloride (0.12 mole) is bubbled into the reaction mixture. Chlorine (0.12 mole) is dissolved in chloroform (80 ml.) and slowly dripped into the rapidly stirred salt solution at 0° C. The reaction solution is stirred one half hour after adding the chlorine, and sodium bicarbonate (0.12 mole) is added at 0° C. The mixture is allowed to warm to room temperature, and stored overnight at −10° C. Thereafter, the precipitate is separated and added to a stirred mixture of ether and strongly basic water. The dissolved solid is washed with saturated sodium chloride until pH 8, dried with sodium sulfate, and evaporated under vacuum, to afford a solid which is crystallized from ethyl acetate to yield 2-chloro-3-(2-diethylaminoethyl)indole.

In the same manner, the following compounds are obtained:

2,4,6-trichloro-3-(4-dipropylaminobutyl)indole;
2-chloro-6-methyl-2-(2-propylaminoethyl)indole;
2-chloro-6-fluoro-3-(2-dimethylaminopropyl)indole;
2-chloro-5,6-dimethyl-3-(2-dimethylaminoethyl)indole;
3-aminopropyl-2-chloro-6-propoxyindole; and
5,6-dibromo-2-chloro-3-(2-diethylaminoethyl)indole.

EXAMPLE III 3-(2-diethylaminoethyl)indole (0.0615 mole) is dissolved in anhydrous tetrachloroethane (266 ml.), and anhydrous hydrogen iodide (0.615 mole) is bubbled into the reaction mixture. Iodine (0.615 mole) is dissolved in tetrachloroethane (40 ml.) and dripped into the rapidly stirred salt solution at −25° C. over one hour. The reaction solution is stirred ten minutes after adding the iodine, and potassium carbonate (0.0615 mole) is added at −25° C. The mixture is allowed to warm to room temperature, and stored overnight at −10° C. The precipitate is filtered and added to a stirred mixture of ether and strongly basic water. The dissolved solid is washed with saturated sodium chloride until pH 8 is obtained, then dried with sodium sulfate, and evaporated under vacuum, giving a solid which is crystallized from dioxane to afford 3-(2-diethylaminoethyl)-2-iodoindole.

In like manner, the following compounds are obtained:

6-ethoxy-3-(3-diethylaminopropyl)-2-iodoindole;
5,6-diethyl-2-iodo-3-(2-dimethylaminoethyl)indole;
6-butyl-2-iodo-3-(4-dipropylaminobutyl)indole;
2,4-diiodo-3-(3-dimethylaminopropyl)indole;
5,6-diethoxy-3-(2-diethylaminoethyl)-2-iodoindole; and
5,6-difluoro-2-iodo-3-(2-pentylaminoethyl)indole.

EXAMPLE IV 2-bromo-3-(2-diethylaminoethyl)indole (8.85 g., 0.03 mole) as prepared in Example I, is added to a mixture of hexane washed in 50% sodium hydride (1.51 g., 0.0315 mole) in dimethylformamide (60 ml.), and stirred at room temperature until all solid is dissolved. Allyl chloride (2.41 g., 0.0315 mole) is dissolved in dimethylformamide (5 ml.) and added in portions to the first prepared solution over ten minutes. The mixture is stirred overnight at room temperature and the dimethylformamide removed under vacuum. Water and ether are added, the organic layer separated, and the water layer is extracted again with ether. The combined ether layers are washed with water, saturated salt, dried with sodium sulfate, and evaporated under vacuum, giving an oil (9.8 g.). The oil is dissolved in benzene-hexane (1:1) and chromatographed on neutral alumina (Woelm) column (300 g.). The eluate is 1-allyl-2-bromo-3-(2-diethylaminoethyl)indole (8.7 g.) which is dissolved in anhydrous ether (350 ml.). A solution of fumaric acid (3 g.) is dissolved in tetrahydrofuran (45 ml.) and slowly added to the stirred ether solution. When cooled in ice and scratched, white crystals (10.5 g., 78%), M.P. 131–136° C. (uncorr.) are obtained. The crude product is recrystallized from acetonitrile, giving white crystals of 1-allyl-2-bromo-3-(2-diethylaminoethyl)indole, fumarate (5.0 g., 37%), M.P. 135–137.5° C. (uncorr.).

*Analysis.*—Calcd. for $C_{17}H_{23}BrN_2 \cdot C_4H_4O_4$ (percent): C, 55.88; H, 6.03; N, 6.21; Br, 17.71. Found (percent): C, 56.14; H, 6.21; N, 6.13; Br, 17.86.

EXAMPLE V 2-bromo-3-(2-diethylaminoethyl)indole (8.85 g., 0.03 mole), as prepared in Example I, is dissolved in a solution of potassium t-butoxide (3.54 g., 0.0315 mole) in t-butanol (130 ml.). Solid 3,4,5-trimethoxybenzoyl chloride (7.27 g., 0.0315 mole) is added in portions over seven minutes, giving a solid after stirring at room temperature for forty minutes. The mixture is refluxed for one hour and worked-up in a manner similar to Example IV, giving a white solid after chromatography which is 2-bromo-3-(2-diethylaminoethyl)-1-(3,4,5-trimethoxybenzoyl)indole (7.8 g.).

The fumarate salt is prepared in a manner similar to Example IV, giving white crystals of 2-bromo-3-(2-diethylaminoethyl)-1-(3,4,5 - trimethoxybenzoyl)indole, fumarate (8.5 g., 47%), M.P. 135–137.5° C. (uncorr.). Recrystallization from acetonitrile gives white crystals (6.9 g., 38%), M.P. 137–138.5° C. (uncorr.).

*Analysis.*—Calcd. for $C_{24}H_{29}BrN_2O_4 \cdot C_4H_4O_4$ (percent): C, 55.54; H, 5.50; N, 4.63; Br, 13.20. Found (percent): C, 55.21; H, 5.30; N, 4.35; Br, 13.40.

EXAMPLE VI 2-bromo-3-(2-diethylaminoethyl)indole (8.85 g., 0.03 mole), as prepared in Example I, is dissolved in a solution of potassium t-butoxide (3.54 g., 0.0315 mole) in t-butanol (100 ml.). p-Chlorobenzyl chloride (5.07 g., 0.0315 mole) is dissolved in t-butanol (20 ml.), and added over fifteen minutes, causing a turbid solution to form. The mixture is stirred at room temperature one hour, refluxed for one hour, and worked-up in a manner similar to Example IV, giving an oil (6.45 g.) after chromotography which is 2-bromo-1-(p-chlorobenzyl)-3-(2-diethylaminoethyl)indole.

The fumarate salt is prepared in a manner similar to Example IV, giving white crystals of 2-bromo-1-(p-chlorobenzyl) - 3 - (2-diethylaminoethyl)indole, fumarate (6.4 g., 40%), M.P. 174–177° C. (uncorr.). The solid is recrystallized from absolute ethanol, giving white crystals (3.8 g., 24%), M.P. 167–167.5° C. (uncorr.).

*Analysis.*—Calcd. for $C_{21}H_{24}BrClN_2 \cdot C_4H_4O_4$ (percent): C, 56.03; H, 5.27; N, 5.23; Br, 14.92; Cl, 6.62. Found (percent): C, 56.31; H, 5.17; N, 5.28; Br, 15.21; Cl, 6.75.

EXAMPLE VII

When the procedure of Examples IV–VI is repeated to react 2-halo-3-substituted indoles with appropriate halides, the following compounds are afforded:

2,5-dibromo-1-methyl-3-(3-dimethylaminopropyl)indole;
2-bromo-1-(3,4,5-triethoxybenzoyl)-6-iodo-3-(3-methylaminopropyl)indole;
2-bromo-1-ethyl-5,6-dimethoxy-3-(5-dimethylaminopentyl)indole;
1-benzyl-2-chloro-6-methyl-3-(2-propylaminoethyl)indole;
2-chloro-6-fluoro-3-(3-dimethylaminopropyl)-1-tosylindole;
2-chloro-5-methyl-3-(2-dimethylaminoethyl)-1-propylindole;
1-(m-bromobenzyl)-5,6-dibromo-2-chloro-3-(2-diethylaminoethyl)indole;
5,6-dibromo-1-(2-butenyl)-2-chloro-3-(2-diethylaminoethyl)indole;

6-ethoxy-3-(3-diethylaminopropyl)-2-iodo-1-phenyl-
sulfonylindole;
5,6-diethyl-1-(p-fluorophenethyl)-2-iodo-3-(2-dimethyl-
aminoethyl)indole;
6-butyl-2-iodo-1-phenethyl-3-(4-dipropylaminobutyl)
indole; and
5,6-diethyl-3-(2-diethylaminoethyl)-2-iodo-1-(p-
propoxyphenylsulfonyl)indole.

What is claimed is:
1. A process for the preparation of compounds having the formula:

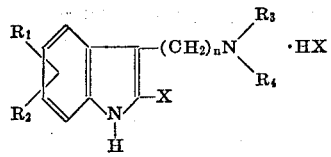

wherein $R_1$ and $R_2$ are selected from the group consisting of hydrogen, halogen, lower alkyl and lower alkoxy; $R_3$ and $R_4$ are selected from the group consisting of hydrogen and lower alkyl; X is selected from the group consisting of chloro, bromo and iodo; $n$ is an integer of from one to about five; which process comprises contacting a 3-substituted indole of the formula:

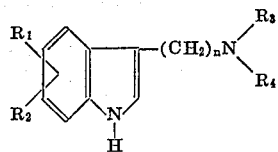

wherein $R_1$, $R_2$, $R_3$, $R_4$ and $n$ are defined as above, with a halogen selected from the group consisting of chlorine, bromine and iodine, in the presence of a corresponding hydrogen halide, in an anhydrous, reaction-inert solvent selected from the group consisting of methylene chloride, chloroform, carbon tetrachloride and tetrachloroethene, at a temperature below about 0° C.

References Cited

Theilheimer: Synthetic Methods of Organic Chemistry, vol. 18, p. 260 (1964).

JOSEPH A. NARCAVAGE, Primary Examiner